(12) United States Patent
Ohashi

(10) Patent No.: US 6,898,626 B2
(45) Date of Patent: May 24, 2005

(54) SYSTEM AND METHOD FOR INSTANTLY ACCESSING A MESSAGE BOARD SERVER

(75) Inventor: Norio Ohashi, Tokyo (JP)

(73) Assignee: NEC Corporation, Tokyo (JP)

(*) Notice: Subject to any disclaimer, the term of this patent is extended or adjusted under 35 U.S.C. 154(b) by 546 days.

(21) Appl. No.: 10/152,618

(22) Filed: May 23, 2002

(65) Prior Publication Data

US 2002/0178165 A1 Nov. 28, 2002

(30) Foreign Application Priority Data

May 23, 2001 (JP) ...................................... 2001-153279

(51) Int. Cl.[7] .............................................. G06F 13/00
(52) U.S. Cl. ...................... 709/206; 709/205; 709/219; 709/225; 709/226
(58) Field of Search ................................ 709/204, 205, 709/206, 217, 219, 223, 225, 226

(56) References Cited

U.S. PATENT DOCUMENTS

| | | | |
|---|---|---|---|
| 6,301,609 B1 * | 10/2001 | Aravamudan et al. | 709/207 |
| 6,513,061 B1 * | 1/2003 | Ebata et al. | 709/203 |
| 6,714,793 B1 * | 3/2004 | Carey et al. | 455/466 |
| 2002/0035605 A1 * | 3/2002 | McDowell et al. | 709/206 |
| 2002/0077080 A1 * | 6/2002 | Greene | 455/412 |
| 2002/0129103 A1 * | 9/2002 | Birkler et al. | 709/203 |

* cited by examiner

Primary Examiner—Viet D. Vu
(74) Attorney, Agent, or Firm—Young & Thompson

(57) ABSTRACT

When a message source user desires to advertise an object such as an event or a sight-seeing resort on an electronic board, a write request is formulated with a message and auxiliary information as to the position and state of affairs of the object, and transmitted to a server finder. Using the position information of the request, the server finder selects one of a number of message board servers for retransmission of the request. On receiving the write request, the selected server maps the contents of this request in a database. When a message recipient user desires to read a message, a read request is formulated with auxiliary information of a desired object and transmitted to the server finder, which retransmits it to one of the servers corresponding to its position information. On receiving the read request the selected server searches its database for messages having likeness to the auxiliary information of the request.

22 Claims, 7 Drawing Sheets

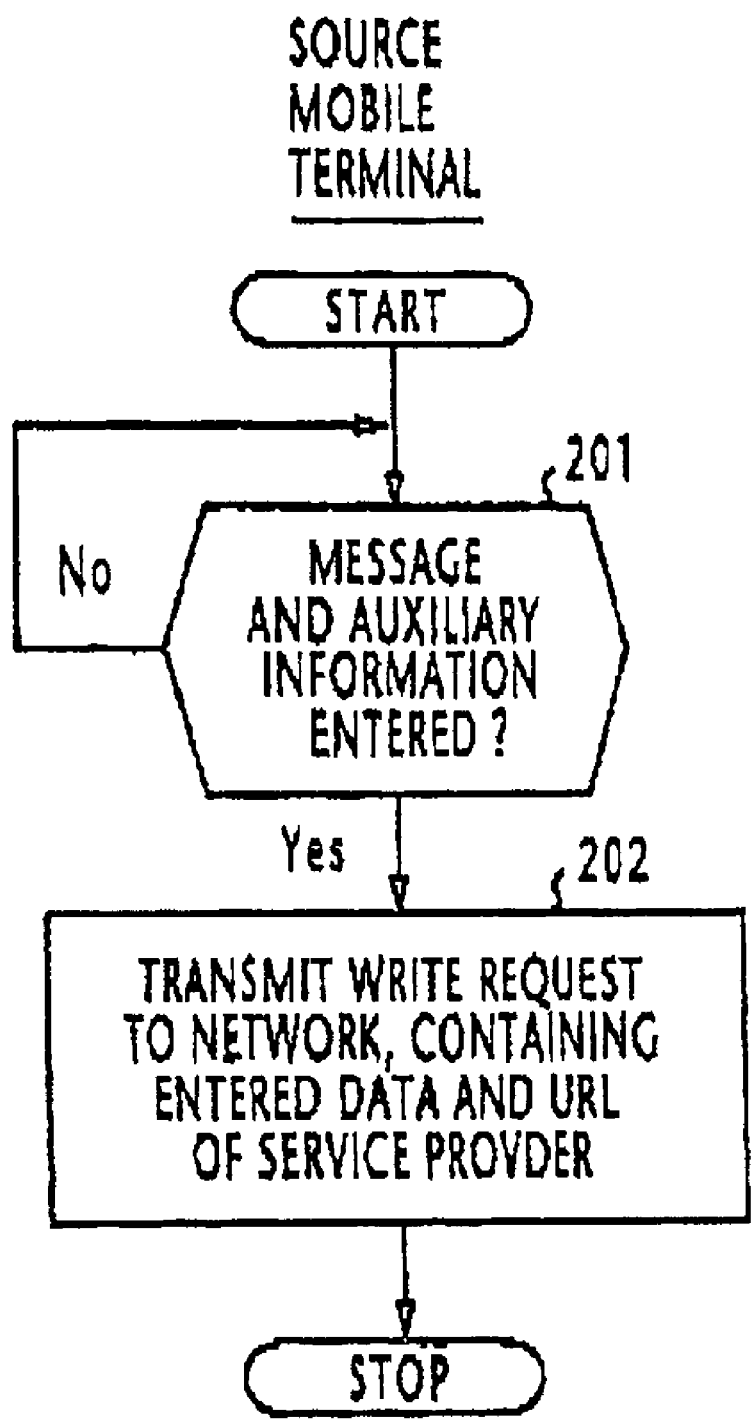

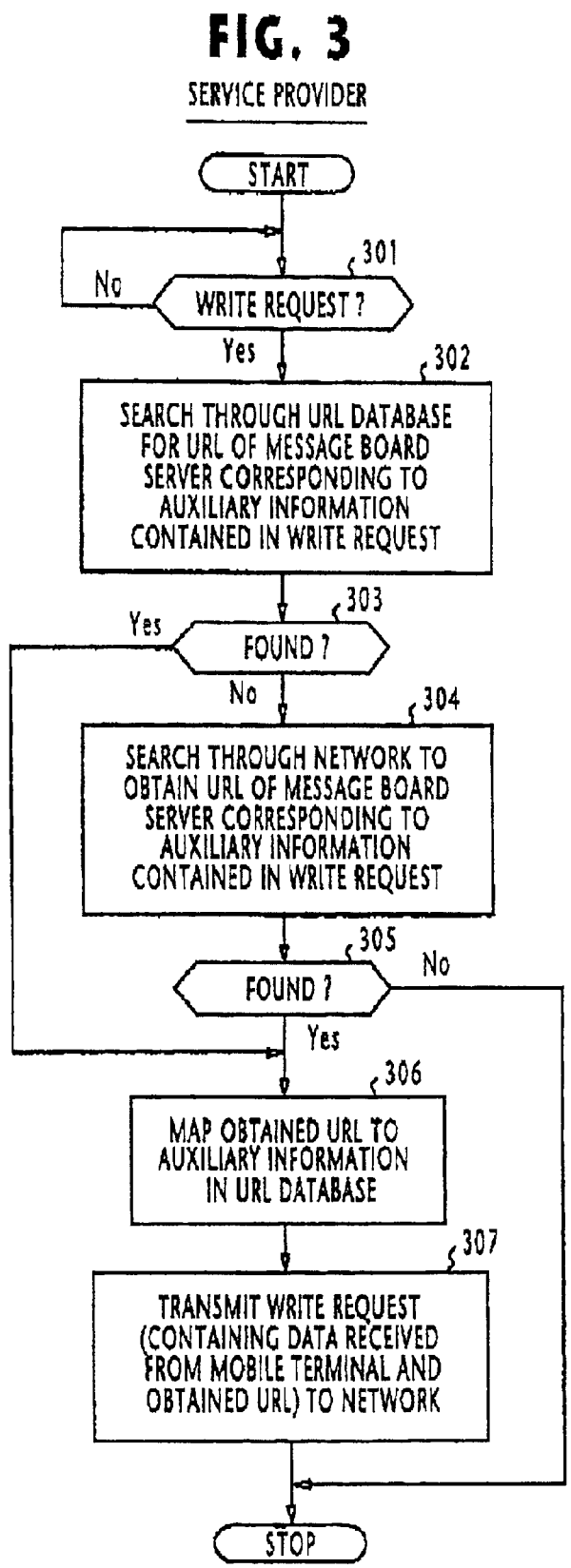

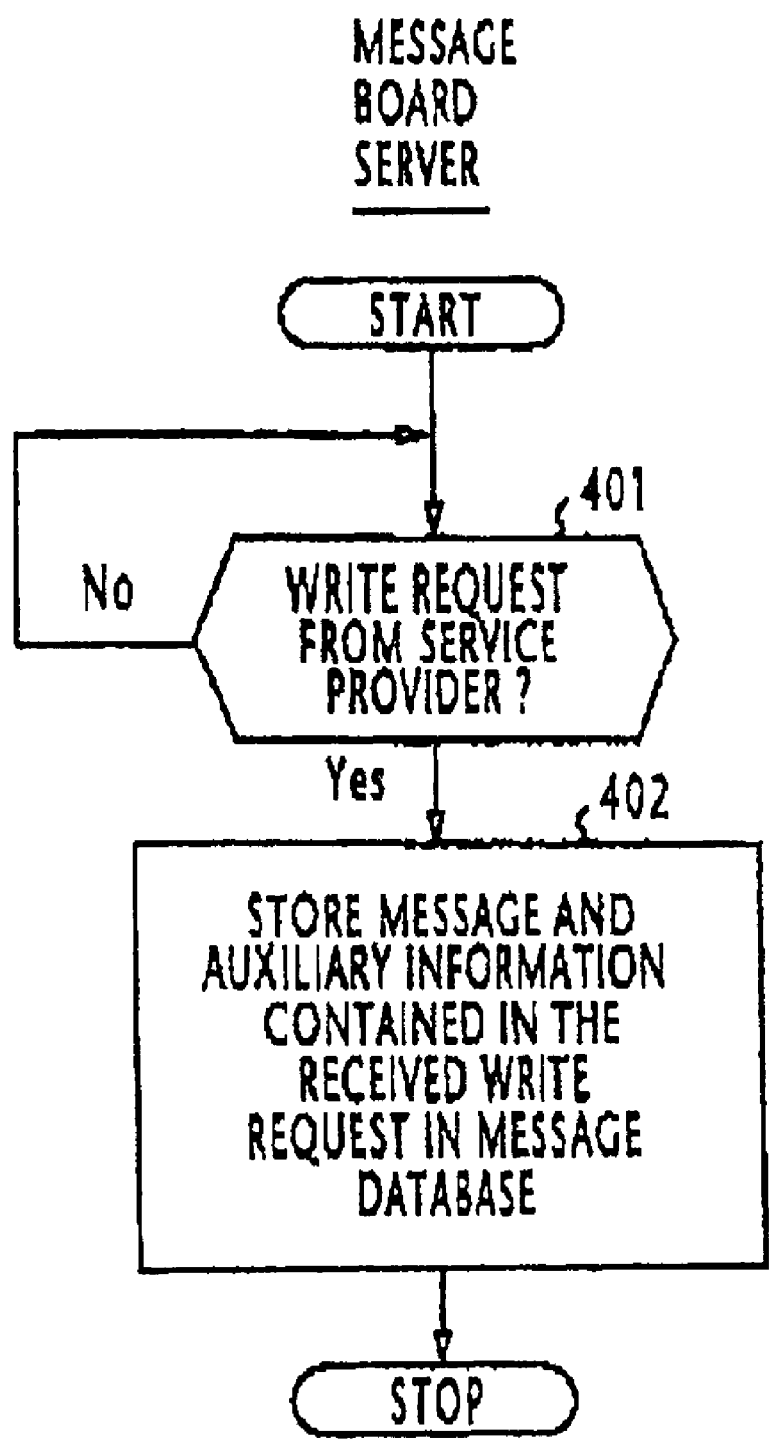

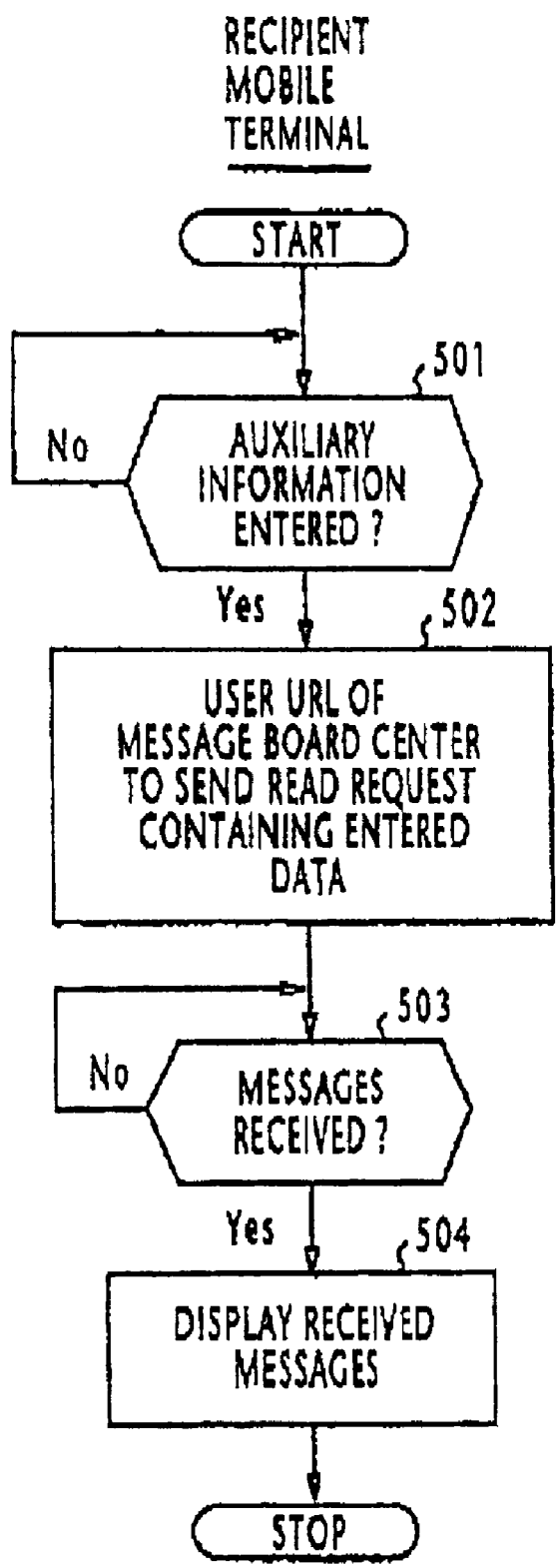

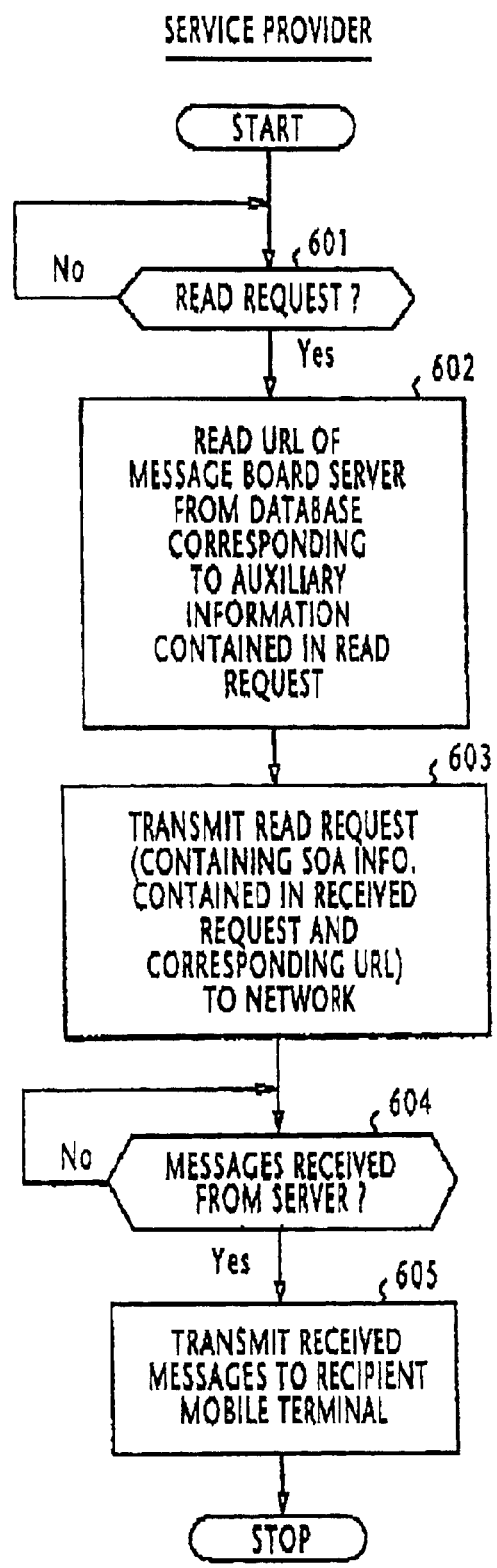

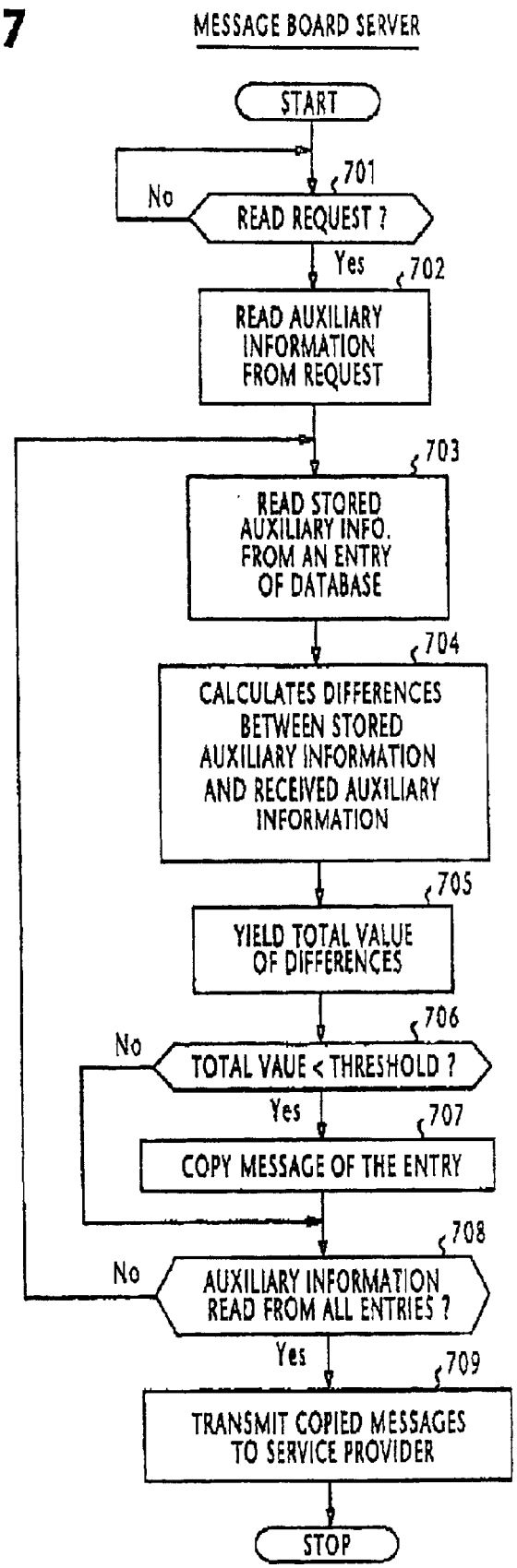

US 6,898,626 B2

SYSTEM AND METHOD FOR INSTANTLY ACCESSING A MESSAGE BOARD SERVER

BACKGROUND OF THE INVENTION

1. Field of the Invention

The present invention relates generally to message communication systems and more specifically to a system and method for advertising messages on an electronic board.

2. Description of the Related Art

The message board is one form of communication between message source users and message recipient users over a communications network. The message board is a database provided in a message board server. Message source users send write requests to the server to write their messages on the message board and message recipient users send read requests to the server to read the contents of the message board. In the prior art, a string of characters known as URL (Uniform Resource Locator) is used to identify the message board. If the message source user creates a message board, he is required to acquire the URL of the server. However, this is tedious and time-consuming if the message source user moves around a people-gathering place and instantly writes an advertising message of a public event that reflects the state of affairs of the place. In addition, a technical knowledge is necessary to create a message board.

Therefore, a need exists to allow users to access a message board server without the need to acquire the URL of the message board.

SUMMARY OF THE INVENTION

It is therefore an object of the present invention to provide a system and method for instantly accessing a desired message board server.

According to one aspect of the present invention, there is provided a communication system comprising a communications network, a message source terminal, a message recipient terminal, a plurality of message board servers and a server finder. The message source terminal transmits a write request via the network to the server finder, containing a message of an advertised object and auxiliary information as to the position and state of affairs of the object. In response to the write request, the server finder selects one of the servers based on the position information of the write request and retransmits the write request via the network to the selected server. The message recipient terminal transmits a read request via the network to the server finder, containing auxiliary information as to the position and state of affairs of an object. In response to the read request, the server finder selects one of servers based on the position information of the read request and retransmits the read request via the network to the selected server. Each of the message board servers, on receiving the write request from the server finder, stores the contents of the write request in an entry of a database, and on receiving the read request from the server finder, makes a search through the database for detecting a plurality of messages having likeness to the contents of the received read request.

Preferably, each message board server detects a plurality of differences in quantitative terms between the state-of-affairs information contained in the read request and a plurality of state-of-affairs information stored in the database, compares the differences with a decision threshold to select a group of the differences smaller than the decision threshold, and reads the group of messages from the database corresponding to the group of differences.

According to a second aspect, the present invention provides a method of advertising messages comprising the steps of (a) transmitting a write request from a message source terminal to a server finder via a communications network, the write request containing a message and auxiliary information, the auxiliary information indicating the position of an object to be advertised and state of affairs of the object, (b) receiving, at the server finder, the write request, selecting one of a plurality of message board servers based on the position information of the write request and retransmitting the write request via the network to the selected server, (c) receiving, at the server selected by step (c), the retransmitted write request and storing the message and the auxiliary information contained in the write request in an entry of a database, (d) transmitting a read request from a message recipient terminal to the server finder via the communications network, the read request containing auxiliary information indicating the position of an advertised object and state of affairs of the object, (e) receiving, at the server finder, the read request, selecting one of the servers based on the position information of the read request and retransmitting the read request via the network to the selected server, and (f) receiving, at the server selected by step (e), the retransmitted read request and detecting a group of auxiliary information in the database having likeness to the auxiliary information contained in the received read request, and reading a group of messages from the database corresponding to the group of auxiliary information for transmission to the message recipient terminal.

BRIEF DESCRIPTION OF THE DRAWINGS

The present invention will be described in detail further with reference to the following drawings, in which:

FIG. 2 is a flowchart of the operation of a message source terminal when a write request is transmitted to the network;

Figure 1:
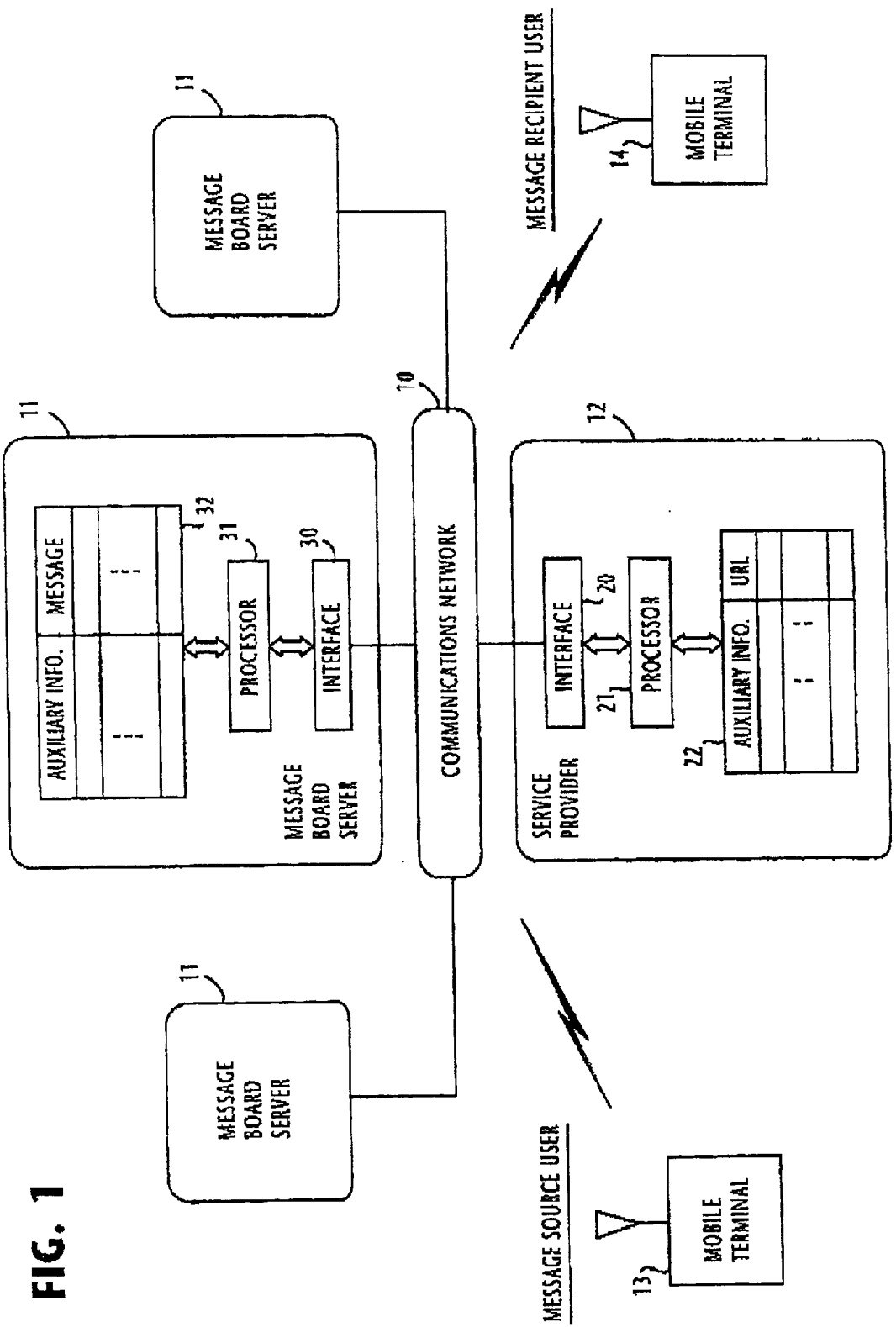
FIG. 1 is a block diagram of a communications network of the present invention.

Fig, 3 is a flowchart of the operation of the service provider of FIG. 1 when the write request is received from a message source terminal;

FIG. 4 is a flowchart of the operation of a message board server when a write request is received from the service provider;

FIG. 5 is a flowchart of the operation of a message recipient terminal when a read request is transmitted to the network;

FIG. 6 is a flowchart of the operation of the service provider when a write request is received from a message recipient terminal; and FIG. 7 is a flowchart of the operation of a message board server when a read request is received from the service provider.

DETAILED DESCRIPTION

Referring to FIG. 1, there is shown a communication system of the present invention. The system is comprised of a communications network 10, and a service provider (server finder) 11 and a plurality of message board servers 12. Communications network 10 includes a wireless mobile network and the Internet (not shown) to allow wireless mobile terminals 13 and 14 to access the service provider 11.

Service provider 11 includes a processor 21 that is connected to the network 10 via an interface 20 and a URL database 22. URL database 22 has a plurality of entries for mapping state-of-affairs information and corresponding URLs identifying the message board servers 12.

Each message board server 12 has a processor 31 connected to the network via an interface 30 and a message database 32, which is an electronic message board. Database 32 has a plurality of entries for mapping state-of-affairs information and corresponding messages. Message processor 31 monitors the time lapse of each entry of the database to delete its stored information when it exceeds a predetermined length of time.

The following is a description of the operation of the system with reference to the flowcharts of FIGS. 2 to 7 by assuming that the mobile terminal 13 is a cellular mobile phone of a message source user and the mobile terminal 14 is likewise a mobile phone of a message recipient user.

When the message source user intends to write a message about an event to be advertised into the electronic message board, he enters a message of an object such as a public event and a sight-seeing resort to be advertised and auxiliary information as to the position and state of affairs of the advertised object. The state-of-affairs information includes one of more of information as to the best season of the year, the date, the time of day, the weather, depending on the type of the advertised object. The write request contains the address information of the service provider 11. The write request is transmitted to the network and routed to the service provider 11.

In FIG. 2, when the message and state-of-affairs information are entered (step 201), the source mobile terminal 13 transmits a write request to the network containing the entered data and the URL of the service provider 11 (202).

In FIG. 3, when the processor 21 at the service provider receives the write request at step 301, it makes a search through the URL database for the URL of a message board server corresponding to the state-of-affairs information (particularly, the location data) contained in the write request (step 302). If no corresponding URL is found (step 303), the processor 31 proceeds to make a further search through the network 10 to obtain the URL (step 304). If the corresponding URL is obtained (step 305), the state-of-affairs information is mapped to the obtained URL in one entry of the URL database 22 (step 306). At step 307, the processor 21 formulates a write request with the data received from the message source terminal 13 and the obtained URL of the message server and transmits the write request to the network 10.

The write request transmitted from the service provider 11 is routed through the network 10 to one of the message board servers 12 that is identified by the URL contained in the write request.

In FIG. 4, when the URL-identified message board server 12 receives the write request from the service provider 11 (step 401), the server stores the message and auxiliary information contained in the write request in one entry of the message database 22 (step 402).

When the user at the message recipient terminal 14 wishes to read a message from the network, he enters auxiliary information such as the current geographical location of a desired object and the current time of day and the URL of the service provider to the mobile terminal 14. If the user is in the neighborhood of the desired object such as a music concert, the current location is the location where the user is in, When such data is entered (step 501), the mobile terminal 14 formulates a read request with the entered auxiliary information and sends it to the network 10 (step 502). As a result, the read request of the mobile terminal 14 is routed through the network 10 to the service provider (server finder) 11.

In FIG. 6, when the server finder 11 receives the read request (step 601), the processor 21 selects a URL from the URL database 22 based on the position data of the auxiliary information of the read request (step 602) and retransmits the read request via the network 10 to the message board server 12 identified by the selected URL (step 603).

In FIG. 7, when the URL-identified message board server receives the read request from the service provider 11 (step 701), the processor 31 of the server reads the auxiliary information contained in the received read request (step 702). Processor 31 makes a search through the database 22 for a group of auxiliary information having a high degree of likeness to the received auxiliary information and reads a group of messages corresponding to such a group of auxiliary information. This database search proceeds as follows:

At step 703, the server reads auxiliary information stored in one entry of the message database 22. At step 704, the processor 31 compares between the auxiliary information of the read request with the that stored in that entry of the database to calculate differences between them and yields a total value of the calculated differences as a measure of likeness to the auxiliary information the message recipient user has transmitted to the network (step 705). The total value of the differences is compared with a decision threshold (step 706). Since the auxiliary information contained in the read request includes information as to the current geographical location of the message recipient user and the current time of day, the calculated differences represent a geographical distance and a time difference (i.e., space and time differences). Therefore, the total value of these differences represents a vector sum of different dimensions.

If the total value is smaller than the decision threshold, the decision at step 706 is affirmative and the processor advances to step 707 to copy the message stored in the current entry of the message database 32, and proceeds to step 708. If the total value is not smaller than the decision threshold, flow proceeds to step 708, without copying the message of that entry, At step 708, the processor 31 checks to see if auxiliary information has been read from all entries of the message database 32. If not, flow returns to step 703 to repeat the search process on the next entry of the message database 32, If likeness evaluations have been made for all entries of the database 32, the decision at step 708 is affirmative and flow proceeds to step 709 to transmit the message copies to the service provider 11.

Returning to FIG. 6, when the service provider 11 receives the messages from the message board server (step 604), the processor 21 transmits the received messages to the recipient mobile terminal 14 (step 605).

In FIG. 5, when the mobile terminal 14 receives a group of messages from the service provider 11 (step 503), the messages are displayed (step 504). The user at the recipient mobile terminal 14 treats the displayed messages as a group having a relatively high degree of likeness to the state-of-affair information he has transmitted on the read request. If the recipient user is located near or at the location of an advertised public event, the displayed messages may contain a message that is best fit to the current location of the user.

Assume that a message to be advertised by the message board server 11 is a notice of tickets for a music concert by an amateur band for advertising to young people. The message source user may hunt for public places which are popular to young people and make a trip to such places to determine the time of day at which many young people gather. If the message source user considers that the place is appropriate for holding a music concert, then he formulates a write message with state-of-affairs information including the geographical location of the public place, the time of day at which the concert will start and the time of day at which it will end, and transmits the request to the network. Additionally, the auxiliary information also contains cache data that specifies the date at which that the music concert will begin and the date at which it will end. Processor 21 allows recipient users to access the advertising message of the music concert for a period between the opening and closing dates specified by the cache data.

As a result, the message source user can benefit from the advantage of an approach analogous to what is known as a direct marketing approach.

The present invention can also be used in tourist guidance applications. In such applications, the message source user (or tourist guide) visits a sight-seeing resort and moves around looking for high spots of the tour, places for taking a rest and warning notices in exciting places and formulates a message with a description of what he has observed. The auxiliary information supplied from the message source terminal includes the season of the year and the weather condition, in addition to the geographical location and the time of day at which the information is sent to the network. The inclusion of the season and weather information serves to narrow the range of target tourist resorts with the result that message recipient users (sightseers) can easily choose best places for a particular season of the year.

The decision threshold used for assessing the degree of likeness to the auxiliary information entered by a tourist may be varied depending on the type of resort. For instance, if the tourist resort is a place for mountain climbing, the likeness to the season and weather information may be given priority over the likeness to the information as to the geographical location. The prioritization can be implemented by evaluating such information in quantitative terms and scaling them with different weight factors.

What is claimed is:

1. A communication system comprising:
   a communications network;
   a message source terminal for transmitting a write request containing a message of an advertised object and auxiliary information as to the position and state of affairs of the object;
   a message recipient terminal for transmitting a read request containing auxiliary information as to the position and state of affairs of an object;
   a plurality of message board servers connected to the network; and
   a server finder for receiving said write request from the message source terminal via said network, selecting one of said servers based on the position information of the write request and retransmitting the write request via the network to the selected server, and for receiving said read request from the message recipient terminal via said network, selecting one of said servers based on the position information of the request and retransmitting the read request via said network to the selected server,
   each of said servers receiving said write request from said server finder and storing contents of the write request in an entry of a database, and receiving said read request from said server finder and making a search through said database for detecting a plurality of messages having likeness to the contents of the received read request.

2. The communication system of claim 1, wherein the server finder selects a first one of the servers according to a location of the message source terminal and selects a second one of the servers according to a location of the message recipient terminal.

3. The communication system of claim 1, wherein each of the message board servers is arranged to:
   detect a plurality of differences in quantitative terms between the auxiliary information contained in the read request and a plurality of auxiliary information stored in the database,
   compare the differences with a decision threshold to select a group of the differences smaller than the decision threshold, and
   read the group of messages from the database corresponding to the detected group of differences.

4. The communication system of claim 1, wherein the auxiliary information of the write request indicates the geographical location of said message source terminal.

5. The communication system of claim 4, wherein the auxiliary information of the write request further includes time of day at which the write request is transmitted from the message source terminal to the network.

6. The communication system of claim 4, wherein the auxiliary information of the write request indicates a weather condition of a tourist resort.

7. The communication system of claim 6, wherein the auxiliary information of the write request indicates a season of the year.

8. The communication system of claim 5, wherein the message of the write request advertises a public event.

9. The communication system of claim 7, wherein the message of the write request advertises a sight-seeing resort.

10. The communication system of claim 1, wherein said message source terminal and said message recipient terminals are wireless mobile terminals.

11. A method of advertising messages comprising the steps of:
   a) transmitting a write request from a message source terminal to a server finder via a communications network, said write request containing a message and auxiliary information, the auxiliary information indicating the position of an object to be advertised and state of affairs of the object;
   b) receiving, at the server finder, the write request, selecting one of a plurality of message board servers based on the position information of the write request and retransmitting the write request via the network to the selected server;
   c) receiving, at the server selected by step (c), the retransmitted write request and storing the message and the auxiliary information contained in the write request in an entry of a database;
   d) transmitting a read request from a message recipient terminal to the server finder via said communications network, said read request containing auxiliary information indicating the position of an advertised object and state of affairs of the object;
   e) receiving, at the server finder, the read request, selecting one of the servers based on the position information of the read request and retransmitting the read request via the network to the selected server; and
   f) receiving, at the server selected by step (e), the retransmitted read request and detecting a group of auxiliary information in said database having likeness to the auxiliary information contained in the received read request, and reading a group of messages from said database corresponding to said group of auxiliary information for transmission to said message recipient terminal.

12. The method of claim 11, wherein step (b) comprises selecting said one of the servers according to a location of the message source terminal and step (e) comprises selecting said one of the servers according to a location of the message recipient terminal.

13. The method of claim 11, wherein step (f) further comprises the steps of transmitting said group of messages to said server finder and transmitting the group of messages from the server finder to the message recipient terminal.

14. The method of claim 11, wherein the step (f) comprises the steps of:

detecting a plurality of differences in quantitative terms between the auxiliary information contained in the read request and a plurality of auxiliary information stored in said database;

comparing said differences with a decision threshold to select a group of said differences smaller than the decision threshold; and reading said group of messages from the database corresponding to the detected group of differences.

15. The method of claim 11, further comprising the steps of:

displaying the transmitted group of messages at said message recipient terminal; and choosing one of the displayed messages.

16. The method of claim 11, wherein the position information of the write request indicates the location of said message source terminal.

17. The method of claim 16, wherein the auxiliary information of the write request further includes time of day at which the write request is transmitted from the message source terminal to the network.

18. The method of claim 16, wherein the auxiliary information of the write request further includes information as to a weather condition of a tourist resort.

19. The method of claim 16, wherein the auxiliary information of the write request further indicates a season of the year.

20. The method of claim 16, wherein the message of the write request advertises a public event.

21. The method of claim 16, wherein the message of the write request advertises a sight-seeing resort.

22. The method of claim 11, wherein said message source terminal and said message recipient terminals are wireless mobile terminals.

* * * * *